March 26, 1968  A. K. BARKER  3,374,511
CABLE GRIP
Filed Jan. 10, 1966
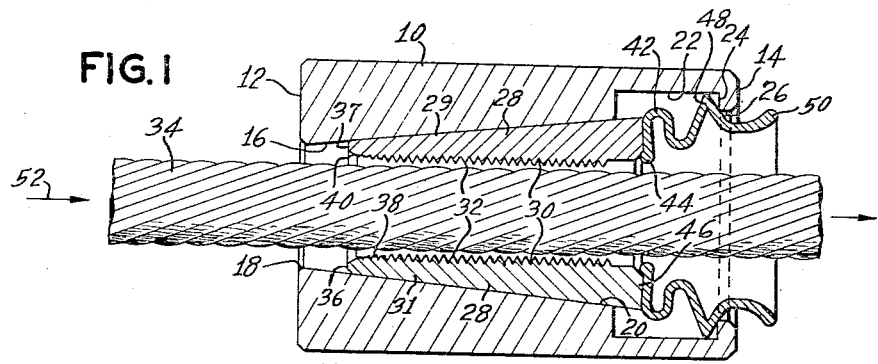
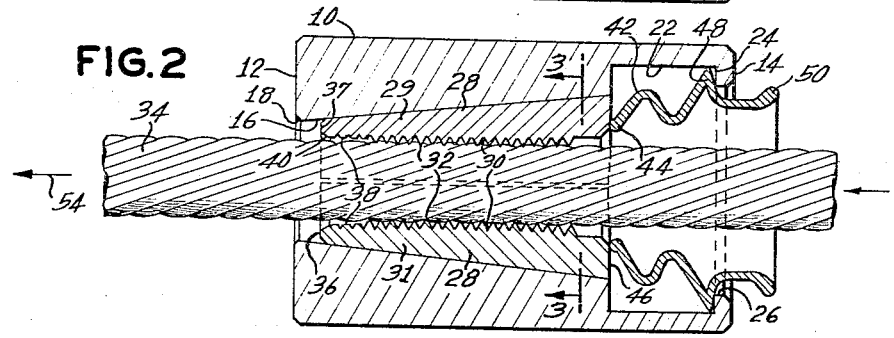
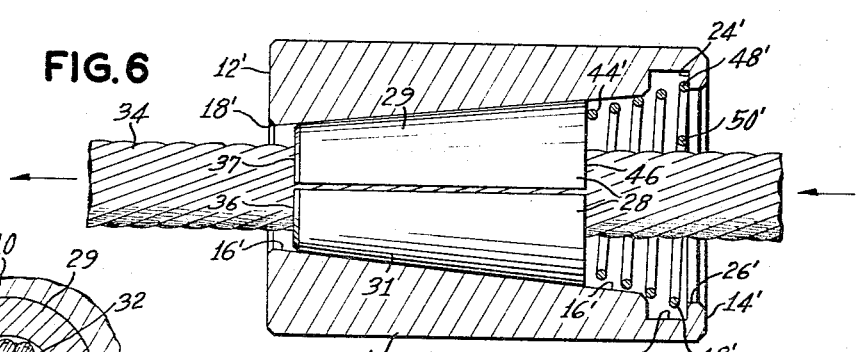
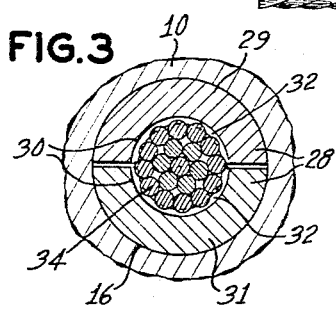
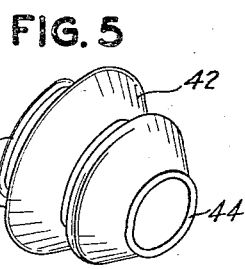
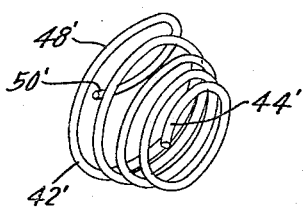
INVENTOR.
Arthur Kenneth Barker
BY
George H. Baldwin
ATTORNEY 3,374,511
CABLE GRIP
Arthur Kenneth Barker, Alwoodley, Leeds, England, assignor to Cable Cover Limited, London, England, a company of Great Britain
Filed Jan. 10, 1966, Ser. No. 519,490
10 Claims. (Cl. 24—126)

ABSTRACT OF THE DISCLOSURE

A strand chuck including a unitary barrel having a centrally disposed and tapered bore through the barrel and a plurality of circumferentially arranged jaws slidably mounted in the bore and correspondingly tapered to engage the tapered walls in an axial direction of the bore, with the larger end of the bore being sufficiently large in dimension such that the jaws may pass freely therethrough. The barrel of the chuck has a shoulder generally facing the narrow end of the bore and being positioned closely adjacent the larger end of the bore. The strand chuck further includes a generally conical shaped resilient member in the form of a coil spring or rubber bellows positioned within the bore and having its larger end abutting the shoulder and its smaller end abutting the larger ends of the jaws to forcibly urge the jaws toward the narrow end of the bore and to maintain the jaws within the bore.

---

The present invention pertains to anchor grips or chucks for wire strand and the like, and to such grips or chucks which are especially adapted for use in pre-stressed concrete work. More particularly this invention relates to improvements in strand chucks or cable grips which are designed for repeated attachment to and release from wire cable, employed for example in pre-stressed concrete structural members, and to such grips or chucks which can be moved into position and locked on braided wire without dismantling and reassembling any part of the apparatus.

In the construction of pre-stressed concrete structures wire strands, steel rods or the like are held under tension in the form in which the concrete is molded so as to embed the wire strands or rods in the concrete. Opposite ends of the wire strand are ordinarily held in chucks or friction grip devices, between which the wire strands are placed under tension.

Many types of gripping devices are in use and where there are high stress requirements the typical chuck or cable grip will generally comprise a body or sleeve portion having a conical bore therethrough in which is received a plurality of generally wedge shaped jaws tapered complementarily to the bore, each jaw having an interior face provided with teeth to engage the cable or wire strand to implement the friction of the jaws on the same. Thus, when the cable is seized by the chuck and the cable and chuck are subjected to a separating force the jaws are drawn into the bore and by reason of the slidable engagement thereof with the bore of the body they are forced to close on the cable. As the tapered jaws move into the progressively restricted bore of the sleeve they are forced against the wire in an ever tightening grip such that the gripping action increases with increase in tension.

In its operation the main requirement of a strand chuck or cable grip is that it be capable of withstanding and transmitting the maximum stress that can be exerted on the wire without slipping or breaking the wire. Although the fundamental construction as above set forth has received acceptance, problems still exist and many improvements are required for the satisfactory and reliable operation, ease of use and economical manufacture thereof. Therefore, it is a general object of this invention to provide an improved chuck or grip for wire strand, cable or the like which is more economical to manufacture, reliable in operation, and easier to reuse than the cable grips or strand chucks heretofore known.

A further general object of the instant invention is to provide an improved strand chuck or cable grip having fewer parts and being of a simpler construction than those heretofore known.

A more specific object of this invention is to provide an improved strand chuck or cable grip having a simpler and improved means for urging the jaws toward the narrow end of the tapered bore within the sleeve or barrel of the chuck.

A further specific object of the subject invention is to provide an improved cable grip or strand chuck wherein the rear of the chuck jaws are visable at all times, even during those periods when a cable or wire strand is in place within the chuck extending therethrough.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

FIG. 1 is a longitudinal cross-section through the improved strand chuck or cable grip of this invention showing the threading of a wire strand therethrough;

FIG. 2 is a longitudinal cross-section similar to FIG. 1 showing the strand chuck after a force has been applied to the wire strand extending therethrough;

FIG. 3 is a cross-sectional view taken along line 3—3 of FIG. 2;

FIG. 4 is a perspective view of a set of generally wedge shaped and tapered jaws typically used within the cable grip of this invention;

FIG. 5 is a perspective view of a resilient member used to urge the wedge shaped jaws toward the narrower end of the tapered bore of the strand chuck in accord with this invention;

FIG. 6 is a longitudinal cross-sectional view similar to FIG. 2 showing a modification of the cable grip of this invention; and FIG. 7 is a perspective view of another resilient member used in FIG. 6 to urge the wedge shaped jaws toward the narrower end of the tapered bore within the strand chuck of the invention.

Referring now to the drawing in detail and specifically to FIGS. 1 and 2, the strand chuck or cable grip of this invention is seen to comprise a generally cylindrically shaped barrel or sleeve 10 having a tapered or conical axial bore 16 with its smaller end 18 adjacent barrel front face 12 and its larger end 20 adjacent but somewhat removed from barrel rear face 14. Machined within the barrel 10 and closely adjacent the rear face 14 thereof is an internal cylindrical portion 22 terminating closely adjacent the rear face 14 such that a small circumferential and inwardly extending shoulder 24 is formed between cylindrical portion 22 and inwardly spaced axial opening 26 in the rear face 14 of the cable grip.

Contained within the tapered bore 16 of chuck 10 is a plurality or set, two being depicted in the embodiment of the invention as shown in FIG. 4, of generally wedge shaped jaws 28 which are tapered complementarily to the bore 16 of the chuck. The interior face 30 of each jaw is provided with teeth 32 to engage a cable or strand of wire 34 extending through the bore 16 and implement the friction of the jaws 28 on the cable. The upper jaw 29 and lower jaw 31 of the set 28 are curved on their exterior surface and tapered to be complementarily to the bore 16 when the cable 34 is tensioned to the rated maximum and the jaws occupy the position shown in FIGS. 2 or 6. The jaws will normally assume a spaced apart position when a cable of appropriate diameter is received therebetween such as depicted in FIG. 6, and it should be understood that in the absence of the cable the jaws may be adjacent with their forward end 36 nearly flush with the smaller end 18 of the tapered bore 16. The teeth 32 on the interior face 30 of the jaws are usually of V-form, cut as a modified buttress thread into an appropriate blank, whereafter the jaws are formed by splitting the blank longitudinally. Oftentimes and most economically the teeth are formed as a helix of uniform diameter in an unslitted blank by means of a tap, after which the jaws are formed by slitting the blank longitudinally. The teeth 32 are usually, as is the case in the embodiment of this invention shown, ground-off, chamfered or tapered at the leading edge 38 thereof to provide for easier threading of the cable through the jaws and to minimize notching and permanent indentation of the cable whereby the breaking strength is not impaired and the useful life thereof is prolonged. The interior face 30 of each jaw may also be slightly tapered as at 40 adjacent the leading edge 36 of each jaw to permit easier threading of the cable through the jaws and chuck.

Still with reference to FIGS. 1 and 2 wherein the preferred embodiment of this invention is shown, there is provided a generally conical shaped resilient member or flexible bellows 42 contained within the inner cylindrical portion 22 and normally extending into the larger end 20 of the tapered bore 16. The purpose of the resilient member 42 is to maintain the jaws 28 within the tapered bore 16 of the sleeve 10, urge the jaws 28 toward the smaller end 18 of the tapered bore 16 and to generally keep the individual jaw members 29 and 31 of the jaw set 28 in alignment such that the cable 34 extending therethrough may be uniformly gripped by the jaws when a separating force is applied between the barrel and cable 34. The forward end 44 of the resilient member 42 abuts the rear edge 46 of the jaw members to generally urge the same toward the smaller end of the tapered bore 16 and to generally keep the jaw members of the set in alignment within the bore. The base or bottom 48 of the conical shaped bellows 42 abuts the shoulder 24 adjacent the inner cylindrical portion 22 such that the bellows 42 may be compressed between its base 48 and its forward edge 44 by a rearward movement of the jaws 28 within the tapered bore 16. The largest diameter of resilient member 42 which occurs at its bottom or base 48 is such that its unstressed dimension is greater than the smallest diameter of the shoulder 24. This relationship may be alternatively stated, i.e., the unstressed diameter of the resilient member 42 at its widest point is greater than the diameter of the opening 26 provided in the rear face 14 of the barrel 10. When a cable of suitable size, such as that as shown at reference numeral 34, is threaded through the jaws 28 they will move rearward within the tapered bore 16 compressing the resilient member 42, as depicted in FIG. 1. Once the cable 34 is in place in the grip and a separating force is applied between the cable and the grip the jaws 28 will move forward within the tapered bore 16 and the resilient member 42 will tend to assume a more relaxed or somewhat unstressed condition as depicted in FIG. 2. Should the cable be completely removed from the chuck and the jaws 28 thereof be permitted to move forward within the tapered bore such that their leading edges 36 and 37 are nearly flush with the front face 12 of the sleeve 10 there will normally be a small gap, in the order of one-quarter of an inch, between the rear 46 of the jaw members and the leading edge 44 of the resilient member 42 when said member is in its relaxed or unstressed condition.

The resilient member or generally conical shaped flexible bellows 42 is shown removed from the strand chuck in a relaxed position in FIG. 5. This member 42 may be fabricated of flexible rubber, resilient plastic or any other like or similar material, so long as the bellows is resilient and compressible. The flexible bellows 42 is provided with a lip or inwardly and rearwardly extending member 50 which protrudes through the opening 26 in the rear face 14 of the barrel 10 to provide a means whereby the bellows 42 may be easily gripped by thumb and finger and removed from the interior of the chuck sleeve, so as to permit removal, repair or replacement of the wedge shaped jaws 28. This lip or member 50 also prevents dirt and grit from entering tapered bore 16 and interfering with the operation of the jaws and chuck.

Another embodiment of the improved cable grip of this invention is depicted in FIGS. 6 and 7, wherein the resilient generally conical shaped member 42 assumes the form of a conical shaped spring 42′ formed from steel spring wire. Similar to flexible bellows 42, conical shaped spring 42′ has a leading edge 44′ which abuts the rearward portion 46 of the chuck jaws 28 to generally urge them toward the smaller end 18′ of the tapered bore 16′ and generally to keep them aligned in the tapered bore 16′. Also the unstressed diameter of the base 48′ of this coil spring 42′ is greater than the smaller diameter of the shoulder 24′ within the inner cylindrical portion 22′ of the sleeve 10′. Additionally, conical spring 42′ is provided with an inwardly extending member 50′ connected to its base 48′ to provide a means whereby the conical spring may be easily removed by screwdriver, pliers or thumb and finger from the interior of the sleeve 10′ such that the jaws 28 may be removed, repaired or replaced. Similarly as with flexible bellows 42, the conical spring 42′ is positioned within the barrel 10′ in the inner cylindrical portion 22′ thereof and extends into the larger end of the tapered bore 16′. As in the previously described embodiment there will be a slight amount of play between the wedge shaped jaws 28 and the forward portion 44′ of the conical spring 42′ when it is in its relaxed position and there is no cable within the chuck.

In operation the improved strand chuck of this invention is threaded with cable as depicted in FIG. 1 wherein the cable is represented by reference number 34, the threading proceeding in the direction of arrow 52. The end of the cable will first abut the forward end 36 of the chuck jaws 28 and push them rearward within the tapered bore 16 to a point where they may spread sufficiently apart to allow passage of the cable 34. When the jaws are moved rearward within the bore 16 they compress resilient member 42 as seen in FIG. 1, the forward portion 44 of this resilient member 42 maintaining the jaws 28 in alignment. Once the cable has been threaded through the chuck to the desired point a separating force is imparted between the chuck and the cable such that the cable 34 tends to move in the direction of arrow 54 as depicted in FIG. 2. When this happens the jaws 28, which are being continually urged forward by flexible member 42, become engaged with and grip the sides of the cable moving forward therewith along the tapered bore 16 a small amount. As more force is applied in the direction of arrow 54 the jaws 28 which are further constricted by tapered bore 16 will grip the cable 34 in an ever tightening manner, it being understood that the chuck is usually held in a fixed position against a suitable abutment (not shown).

With applicant's improved cable grip or strand chuck it is possible to see the position of the wedges at all times since they are easily visible through the opening 26 in the rear face 14 of the chuck barrel 10 and may be checked at any and all times for their positioning within the barrel and alignment on the cable extending therethrough. Applicant's improved chuck employs fewer parts than the strand chucks heretofore known and requires less machining than those of the prior art, making the chuck of this invention more economical to manufacture and sell. The improved design of this grip permits considerable shortening of the length of the barrel thereof thus reducing the weight of the finished product and reducing the cost of the manufacture thereof.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. An improved strand chuck comprising a unitary barrel having a centrally disposed tapered bore therethrough, a plurality of circumferentially arranged jaws slidably mounted in said bore correspondingly tapered to engage the tapered walls in an axial direction of said bore, said barrel having a shoulder therein generally facing the narrow end of said bore and positioned closely adjacent the larger end of said bore, said bore having an opening at its larger end immediately adjacent said shoulder of sufficient dimension to permit said jaws to pass freely therethrough, and a resilient member contained within said barrel having an end portion larger than said opening and engaging said shoulder and having an opposite end portion engaging larger ends of said jaws to forcibly urge said jaws toward the narrow end of said bore.

2. The strand chuck as defined in claim 1 wherein said resilient member is a rubber bellows.

3. The strand chuck as defined in claim 1 wherein said resilient member is a spring wire coil.

4. In a strand chuck having a unitary barrel with a centrally disposed tapered bore therethrough, a plurality of circumferentially arranged jaws mounted in the bore and correspondingly tapered to slidably engage in an axial direction the tapered walls of the bore, the improvement comprising a shoulder unitary with said barrel generally facing the narrow end of the bore and disposed closely adjacent the larger end of the bore, said bore having an opening at its larger end immediately adjacent said shoulder of sufficient dimension to permit said jaws to pass freely therethrough, and a generally conical shaped resilient member positioned within the bore having its larger end portion abutting said shoulder and its smaller end portion abutting the larger ends of the jaws whereby the jaws are urged toward the narrow end of the bore.

5. In the strand chuck as defined in claim 4 wherein said shoulder circumferentially surrounds the larger end of the bore, and wherein the unstressed diameter of said larger end portion of said conical shaped resilient member is greater than the diameter of said larger end of said bore.

6. In the strand chuck as defined in claim 4 wherein said conical shaped resilient member includes a portion extending inwardly of the circumference of its larger end portion for gripping said resilient member whereby the same may be readily removed from said bore of said barrel.

7. In the strand chuck as defined in claim 4, wherein said resilient member is a rubber bellows.

8. In the strand chuck as defined in claim 4, wherein said resilient member is a coil spring.

9. The strand chuck as defined in claim 1 wherein said shoulder circumferentially surrounds said larger bore end, said resilient member within said barrel being generally conically shaped, the unstressed diameter of the larger end portion of said resilient member being greater than the diameter of said larger end of said bore, said larger end portion of said resilient member abutting said shoulder and the smaller end portion thereof abutting said larger jaw ends, said resilient member further including a portion extending inwardly of the circumference of and adjacent its said larger end portion for gripping same whereby said resilient member may be readily removed from said bore of said barrel.

10. The strand chuck as defined in claim 9 wherein said resilient member is a rubber bellows and said portion extends outwardly of said larger bore end for readily gripping same outwardly of said barrel.

References Cited

UNITED STATES PATENTS

| | | | |
|---|---|---|---|
| 2,427,456 | 9/1947 | Hoy | 285—299 X |
| 2,635,901 | 4/1953 | Osborn | 285—105 X |
| 2,640,667 | 6/1953 | Winn. | |
| 3,098,275 | 7/1963 | Schweitzer | 24—126 |
| 3,201,111 | 8/1965 | Afton. | |

FOREIGN PATENTS

| | | |
|---|---|---|
| 663,970 | 5/1963 | Canada. |
| 572,926 | 2/1958 | Italy. |
| 572,927 | 2/1958 | Italy. |

BERNARD A. GELAK, *Primary Examiner.*